United States Patent
Raman et al.

(12) 
(10) Patent No.: US 11,195,217 B2
(45) Date of Patent: Dec. 7, 2021

(54) EVALUATION USING SIMILARITY SCORE FOR PAIRWISE FEATURE SETS

(71) Applicant: Walmart Apollo, LLC, Bentonville, AR (US)

(72) Inventors: Vidhya Rohini Raman, San Jose, CA (US); Paria Ghorbani, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/777,246

(22) Filed: Jan. 30, 2020

(65) Prior Publication Data
US 2021/0241334 A1    Aug. 5, 2021

(51) Int. Cl.
*G06Q 30/00*    (2012.01)
*G06Q 30/06*    (2012.01)

(52) U.S. Cl.
CPC ..... *G06Q 30/0609* (2013.01); *G06Q 30/0619* (2013.01); *G06Q 30/0641* (2013.01)

(58) Field of Classification Search
CPC ................................................ G06Q 30/0609
See application file for complete search history.

(56) References Cited

U.S. PATENT DOCUMENTS

2013/0117246 A1*  5/2013  Cabaniols ............. G06F 40/194
                                                            707/697
2020/0327548 A1* 10/2020  Hartard ............. G06Q 20/4016

OTHER PUBLICATIONS

Renjith, Shini. "Detection of fraudulent sellers in online marketplaces using support vector machine approach." arXiv preprint arXiv: 1805.00464 (2018).*

* cited by examiner

*Primary Examiner* — Kathleen Palavecino
(74) *Attorney, Agent, or Firm* — Duane Morris LLP; Manita Rawat

(57) ABSTRACT

Systems and methods of evaluating a third-party participant for inclusion in a networked environment are disclosed. A plurality of features representative of a third-party participant are received and at least one pairwise feature score is calculated for a first feature and a second feature selected from the plurality of features. The third-party participant is classified into one of a plurality of predetermined categories by a trained model based on the at least one pairwise feature score.

20 Claims, 5 Drawing Sheets

EVALUATION USING SIMILARITY SCORE FOR PAIRWISE FEATURE SETS

TECHNICAL FIELD

This application relates generally to model-based evaluation and, more particularly, to model-based evaluation using pairwise comparisons.

BACKGROUND

Large e-commerce systems may include first-party goods (i.e., products, services, etc. provided by the owner/operator of the e-commerce system) and third-party goods (i.e., products, services, etc. provided by persons/entities other than the owner/operator of the e-commerce system). Third-party sellers present a risk to first-party owners of e-commerce platforms. If third-party sellers fail to fulfill orders (either timely or at all), provide incorrect, counterfeit, defective, or otherwise undesirable goods, or fail to provide positive customer interactions, customers may associate the first-party owner of the e-commerce site with the bad experience caused by third-party sellers using the e-commerce site.

In order to mitigate some of the risks with third-party sellers, an e-commerce platform may require third-party sellers to submit applications to be allowed to use the platform. Applications may include details regarding the person or organization that wishes to sell on the platform. However, such applications may be falsified, either intentionally or unintentionally. Even when true and correct information is provided, it may be difficult to identify which third-party suppliers present higher risks.

SUMMARY

In various embodiments, a system for evaluating a potential third-party participant in a networked environment is disclosed. A plurality of features representative of a potential third-party participant are received and at least one pairwise feature score is calculated for set including a first feature and a second feature selected from the plurality of features. The potential third-party participant is classified into one of a plurality of predetermined categories by a trained model based on the at least one pairwise feature score.

In various embodiments, a non-transitory computer-readable medium having instructions stored thereon is disclosed. The instructions, when executed by a processor cause a device to perform operations including receiving a plurality of features representative of a potential third-party participant and calculating at least one pairwise feature score for a first feature and a second feature selected from the plurality of features. The instructions further cause the device to classify the potential third-party participant into one of a plurality of predetermined categories using a trained model based on the at least one pairwise feature score.

In various embodiments, a method of evaluating a potential third-party participant for a networked environment is disclosed. The method includes steps of receiving a plurality of features representative of a potential third-party participant, calculating at least one pairwise feature score for a first feature and a second feature selected from the plurality of features, and classifying the potential third-party participant into one of a plurality of predetermined categories using a trained model based on the at least one pairwise feature score.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of this invention.

Figure 1:
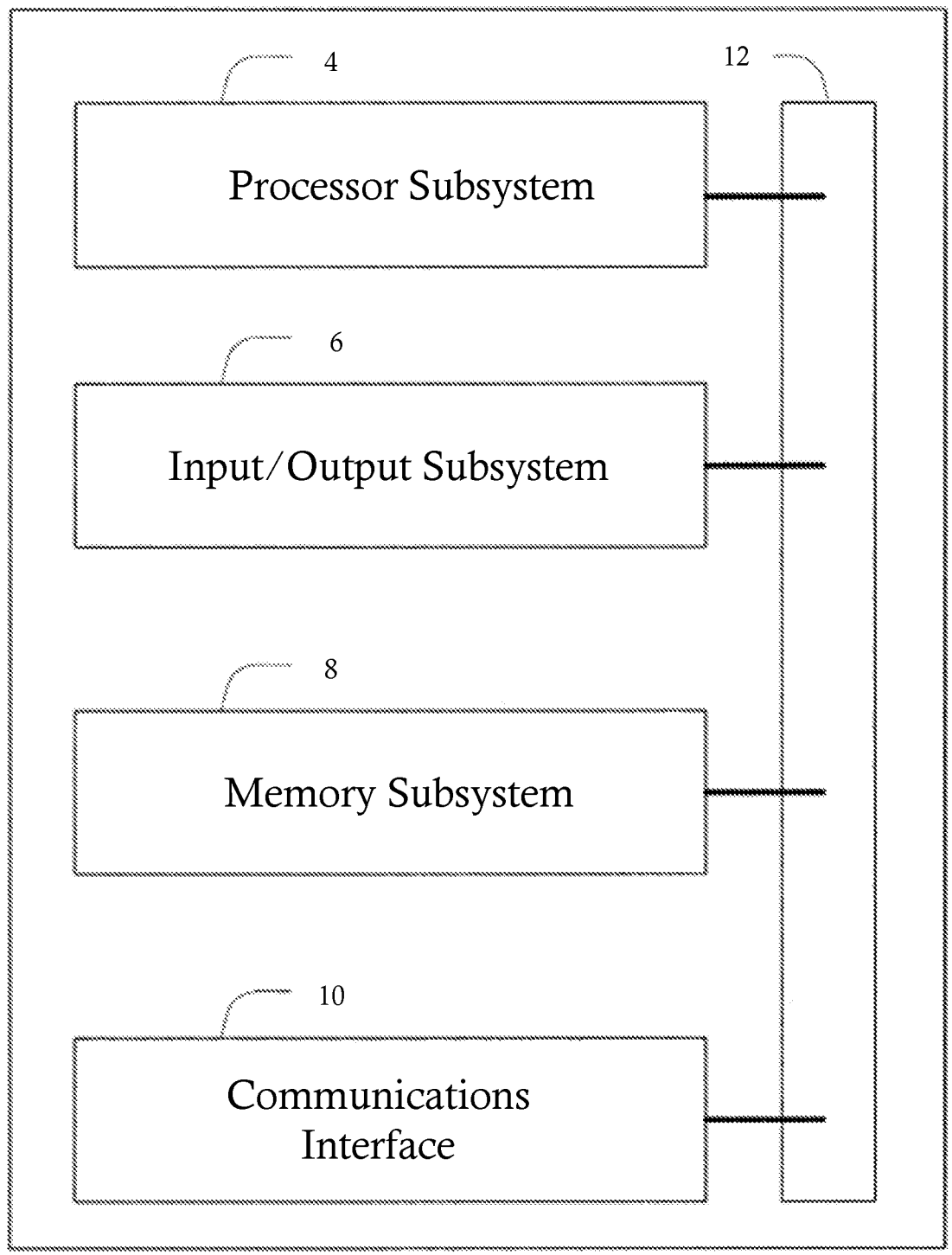
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG)

series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
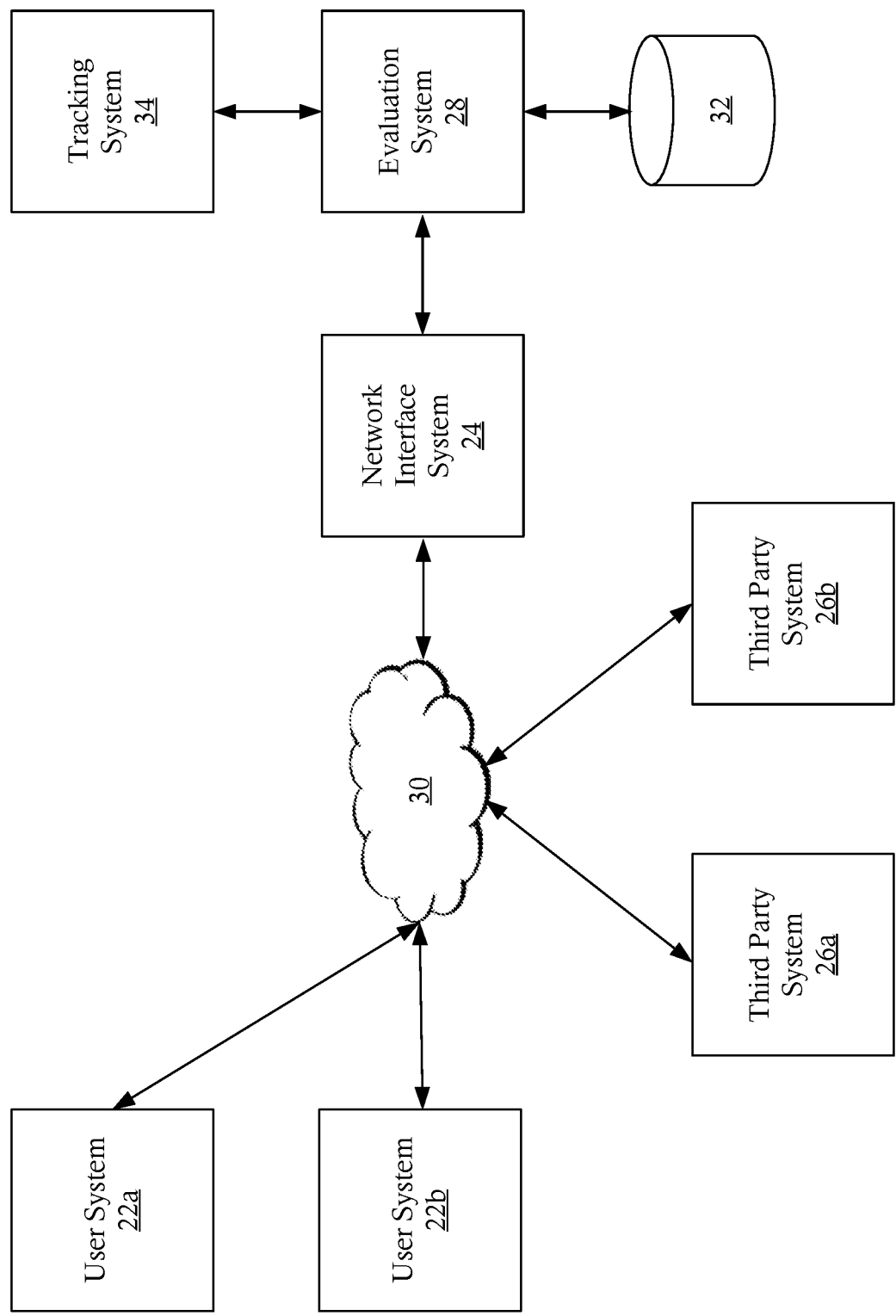
FIG. 2 illustrates an e-commerce platform configured to provide evaluation of third-party participants, in accordance with some embodiments.

FIG. 2 illustrates a networked environment 20 configured to provide evaluation and classification of third-party participants, in accordance with some embodiments. The networked environment 20 may include, but is not limited to, a plurality of user systems 22a-22b, a frontend system 24, a plurality of third-party systems 26a-26c, an evaluation system 28, a third-party information database 32, a tracking system 34, and/or any other suitable systems and/or network components. Although embodiments are illustrated with separate systems, it will be appreciated that two or more of the disclosed systems and/or components may be combined into a single system. For example, in some embodiments, the frontend system 24, the evaluation system 28, and/or the third-party information database 32 may be combined into a single system. Similarly, it will be appreciated that any of the individual systems discussed herein may be split into multiple systems, such as, for example, having multiple frontend systems 24 implementing multiple instances of the e-commerce frontend.

The networked environment 20 includes a plurality of user systems 22a-22b configured to communicate with a network platform through one or more networks 30. The network platform may be provided by a frontend system 24. The network platform may include a network interface, such as, for example, an interface accessible through one or more browsers, applications, devices, etc. For example, in some embodiments, the network platform is an e-commerce platform including an e-commerce interface configured to allow a user to purchase one or more goods and/or services through the network platform. The network platform may allow users to interact with first-party participants (e.g., agents, employees, or other individuals associated with or otherwise controlled by the entity that provides/maintains the network platform) or third-party participants (e.g., companies, persons, etc. not associated with or controlled by the entity that provides/maintains the network platform). For example, an e-commerce platform may enable users (i.e., customers) to purchase goods and/or services directly from the entity that provides/maintains the network platform and/or purchase goods and/or services from a third-party participant that is not owned or controlled by the first-party.

In some embodiments, one or more third-party systems 26a-26b are configured to communicate with one or more systems, such as the frontend system 24 or an evaluation system 28. The third-party systems 26a-26b are associated with one or more existing and/or potential third-party participants of the networked environment 20. For example, to continue the e-commerce example discussed above, a third-party participant of an e-commerce platform may include, but is not limited to, a third-party that offers goods/services for sale through the e-commerce platform, a third-party that completes orders placed through one or more other participants (e.g., first-party, third-party) of the e-commerce platform, etc. (referred to herein as a "third-party supplier" or a "third-party seller"). In other embodiments, third-party participants may include third-parties that offer services through the networked environment, such as technical support, purchase support, business support, etc. It will be appreciated that the term "third-party participant" is used herein to refer to any potential third-party that serves in a role traditionally associated with a first-party owner/operator of a networked environment 20. Third-party participants are not owned, operated, employed by, or associated with the first-party entity providing the network platform (i.e., controlling/operating the frontend system 24, evaluation system 28, tracking system 34, and/or other elements configured to provide a network platform). In some embodiments, the roles that may be performed by third-party participants associated with a third-party system 26a-26b are limited to specific defined roles (e.g., a "seller" or "supplier" in an e-commerce platform).

In some embodiments, prior to and/or concurrently with participating on the network platform (such as offering goods and/or services through an e-commerce platform), current or potential third-party participants are evaluated to assess risks to the first-party based on participation of the third-party participant in the networked environment 20. For example, in various embodiments, risks faced by the owner/operator of an e-commerce frontend include, but are not limited to, reputational risks, product liability risks, compliance risks, legal risks, etc. Although embodiments are discussed herein including an e-commerce platform, it will be appreciated that an owner/operator of a network platform faces any number of potential risks when allowing one or more third-parties to act in traditionally first-party roles through a network platform. For example, third-party participants may be associated with the owner/operator of a networked platform such that failure to fulfill an order, poor product quality, poor customer service, failure to comply with laws, and/or other illegal or unfavorable actions by the third-party may be imputed to the first-party by users, governmental entities, etc.

In some embodiments, an evaluation system 28 is configured to implement a third-party evaluation process to assess third-party participants and determine whether such third-party participants should be provided access to the network platform. As discussed in greater detail below, in some embodiments, the evaluation system 28 includes a trained model configured to categorize a third-party participant into one of a predetermined set of categories. The categorization may be based on pairwise feature set scores and/or ensemble scores calculated for the third-party participant.

In some embodiments, the evaluation system 28 receives a set of features associated with the third-party participant. The feature set may include, but is not limited to, one or more features related to a third-party entity (e.g., a company/entity name, company/entity address, company/entity state of incorporation, company/entity website, etc.), features related to an individual third-party or agent of a third-party entity (e.g., name, e-mail address, physical address, demographic information, system information (e.g., internet protocol address (IP)), etc.), performance metrics measured and/or calculated based on interactions between the third-party participant and the network platform (e.g., engagement score, customer satisfaction, sales, returns, complaints, etc.) and/or any other suitable features associated with a third-party participant. The set of features may be stored in and/or obtained from a storage device in signal communication with the evaluation system 28, such as, for example, the third-party information database 32.

As discussed in greater detail below, the evaluation system 28 is configured to categorize the third-party participant based on one or more pairwise feature set scores generated from one or more pairwise sets selected from the set of features associated with the third-party participant. For example, in some embodiments, the evaluation system 28 is configured to categorize a third-party participant as an approved participant, a rejected participant, a provisional participant, and/or any other suitable category. In some embodiments, the set of features associated with the third-party participant and the category selected for the third-party participant may be stored in a database, such as, for example, third-party information database 32 for use in training and/or retraining of a model configured to categorize third-party participants, as discussed in greater detail below.

If the third-party participant is approved by the evaluation system 28, the third-party participant is allowed to participate in the network platform in one or more roles traditionally associated with a first-party. For example, in an e-commerce platform, an approved third-party participant (e.g., third-party supplier or third-party seller) may be authorized to provide pricing, inventory, shipping, and/or other information regarding one or more goods and/or services to be provided for sale using the e-commerce platform. In some embodiments, after approval, a third-party participant's performance with respect to the network platform may be tracked by a tracking system 34. The tracking system 34 is configured to monitor one or more metrics regarding interactions of the third-party participant with the network platform. For example, in e-commerce platforms, the tracking system 34 may be configured to monitor order fulfillment, customer satisfaction, supplier responsiveness, and/or other supplier metrics.

In some embodiments, the tracking system 34 may be configured to remove, limit access for, and/or otherwise restrict an approved third-party participant if one or more of the tracked metrics are below/above a predetermined threshold and/or evaluation of the third-party participant changes the classification of the third-party participant. For example, in some embodiments, the tracking system 34 is configured to calculate and/or track one or more metrics for each third-party participant. Each metric has a threshold associated therewith. If a metric for an individual third-party participant falls below the predetermined threshold, the third-party participant is removed from the approved set of third-party participants and is no longer able to perform some or all functions activities through the network platform. In some embodiments, each metric may have one or more warning thresholds that trigger a warning to the third-party participant prior to reaching the termination threshold.

In some embodiments, if a third-party participant is removed from the network platform, the third-party participant (and features associates therewith) are flagged as a non-approved (or undesirable) third-party participant in the third-party information database 32. The evaluation model used by the evaluation system 28 may be updated periodically to reflect updates to third-party participants, such as certain third-party participants being removed from or restricted with respect to the network platform, additional third-party participants being rejected/approved, and/or other suitable information. The evaluation model used by the evaluation system 28 may be updated in real-time and/or at any predetermined frequency, such as, for example, daily, weekly, monthly, etc.

Although embodiments are discussed herein including an e-commerce platform, it will be appreciated that the systems and methods disclosed herein are applicable to any system and/or environment that allows third-party participants to act in traditional "first-party" roles. Example environments include, but are not limited to, e-commerce platforms, service environments (e.g., technical assistance, medical assistance, etc.), software-as-a-service environments, server environments, digital environments, and/or any other suitable environment or system.

Figure 3:
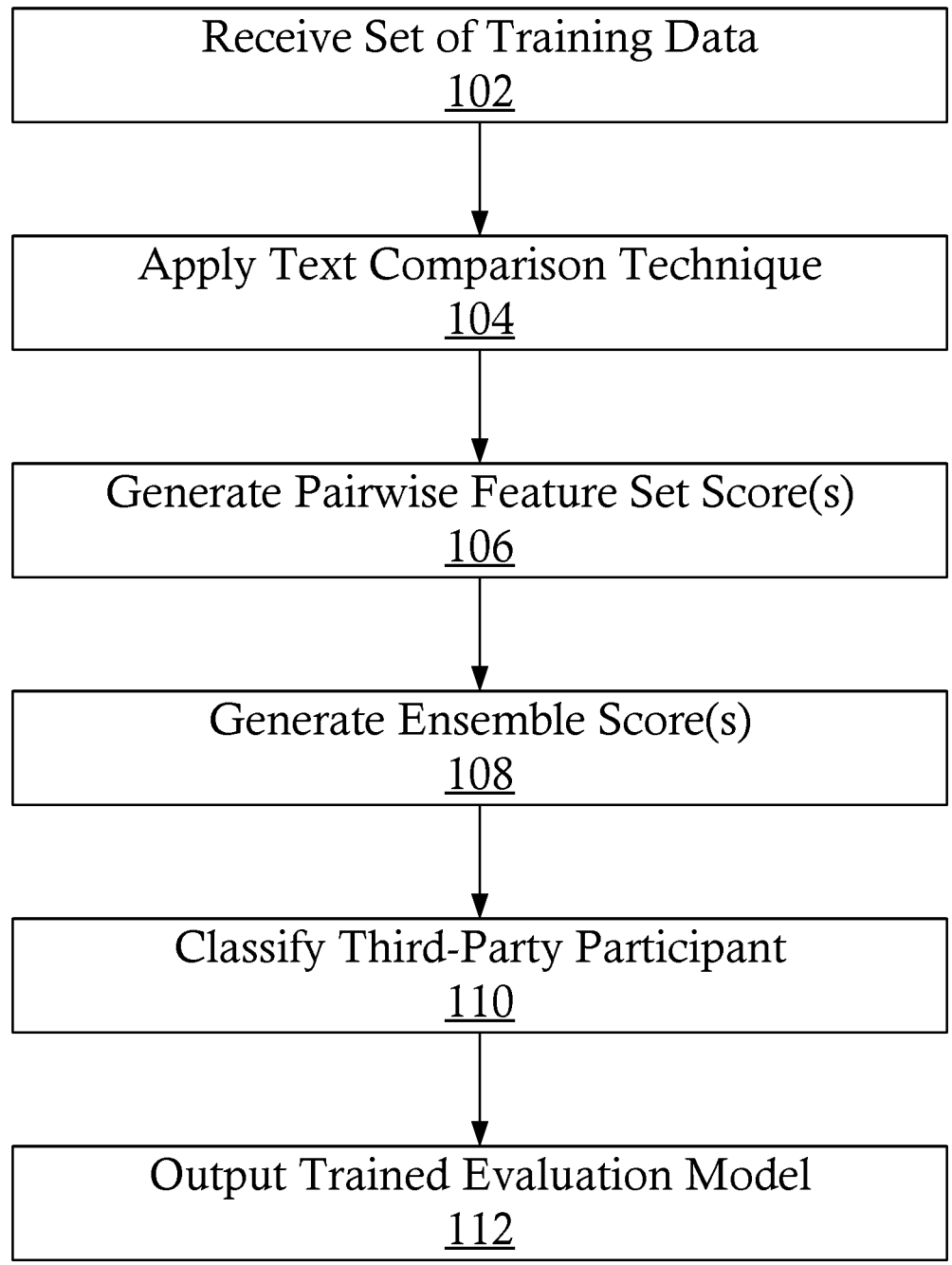
FIG. 3 is a flowchart illustrating a process of generating a trained model configured to classify a potential third-party participant based on one or more pairwise comparisons, in accordance with some embodiments.
Figure 4:
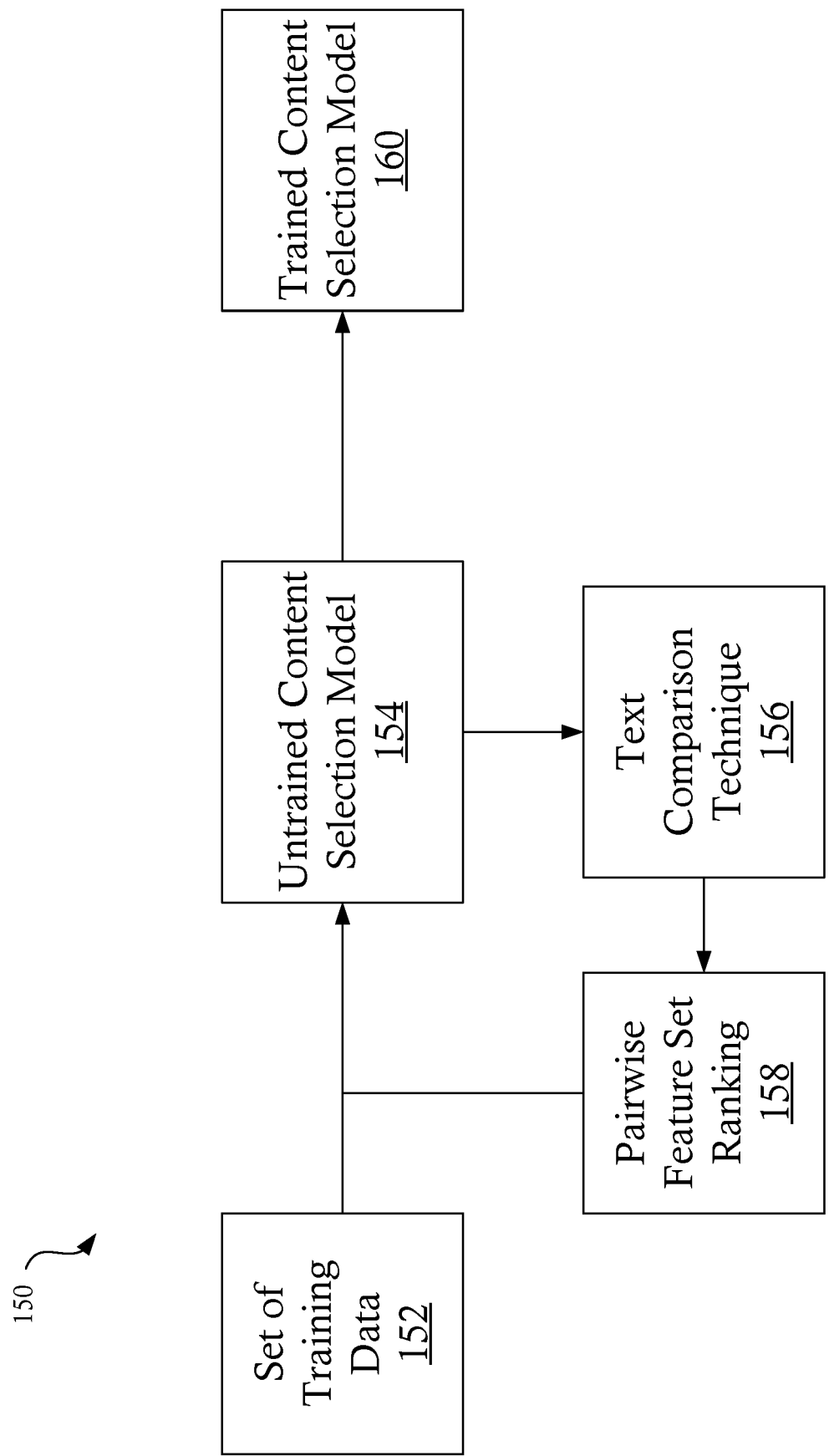
FIG. 4 is a process flow illustrating various steps of the process illustrated in FIG. 3, in accordance with some embodiments.

FIG. 3 is a flowchart illustrating a process 100 of generating a trained model configured to categorize a potential third-party participant based on one or more pairwise feature comparisons, in accordance with some embodiments. FIG. 4 is a process flow 150 illustrating various steps of the process 100 illustrated in FIG. 3, in accordance with some embodiments. At step 102, a set of training data 152 containing features associated with a plurality of third-party participants is received. The set of training data 152 may include, for example, features related to third-party participants that have been approved or rejected from a network platform, third-party participants that were approved but later removed/banned from the network platform, third-party participants that have exemplary tracking metrics, and/or other third-party participants. The features related to each third-party participant may include, but are not limited to, a third-party entity (e.g., a company/entity name, company/entity address, company/entity state of incorporation, company/entity website, company demographic information (e.g., size, markets, etc.), etc.), features related to an individual third-party or agent of a third-party entity (e.g., name, e-mail address, physical address, demographic information, system information (e.g., internet protocol address (IP)), etc.), performance metrics measured and/or calculated based on interactions between the third-party participant and the network platform (e.g., engagement score, customer satisfaction, sales, returns, complaints, etc.) and/or any other suitable features associated with a third-party participant.

At step 104, a text comparison technique 156 is applied to the set of training data 152 (or a subset thereof) to compare text of one or more pairs of feature sets. For example, in some embodiments, a untrained model 154 is configured to perform text comparison of each potential pairwise feature set for each third-party participant in the set of training data 152 (or a subset thereof). A pairwise feature set includes any two features selected from the features included for each third-party participant. Example pairwise feature sets include, but are not limited to, name (individual or company) and email address, state of incorporation and location (individual or company), individual name and company name, individual address and company address, etc. It will be appreciated that any two features provided for a third-party participant may be combined as a pairwise feature set.

In some embodiments, each pairwise feature set may be compared using a predetermined text comparison technique 156, such as a Levenshtein's distance based text comparison. The Levenshtein distance applies a string metric for measuring the difference between two sequences (e.g., text strings). In some embodiments, the Levenshtein distance is equal to the least number of edits that are necessary to transform the first string into the second string. The distance between two strings is given as:

$$lev_{a,b}(i, j) = \begin{cases} \max(i, j) & \text{if } \min(i, j) = 0, \\ \min \begin{cases} lev_{a,b}(i-1, j) + 1 \\ lev_{a,b}(i, j-1) + 1 \\ lev_{a,b}(i-1, j-1) + 1_{(a_i \neq b_j)} \end{cases} & \text{otherwise.} \end{cases}$$

where $lev_{a,b}(i,j)$ is the distance between the first i characters of string a and the first j characters of string b. Although embodiments are discussed herein using the Levenshtein distance, it will be appreciated that other text comparison techniques may be applied.

In some embodiments, one or more features may be divided into sub-features for comparison to other features and/or sub-features. For example, in some embodiments, an e-mail address may be divided into three subparts: a first portion appearing before an "@" symbol, a second portion located between the "@" symbol and a ".", and a third portion appearing after the ".". Each portion of the e-mail address may be compared to a different feature and/or compared to a different subpart of a feature. Continuing the prior example, in some embodiments, a first portion of an e-mail address is compared to an individual name, a second portion of the e-mail address is compared to a company name, and a third portion of the name may be compared to a company type. Although specific embodiments are discussed herein, it will be appreciated that any feature may be divided into any number of sub-features and that any sub-feature may be compared to any one or more other features or sub-features. For example, an e-mail address may be split into two or more sub-features and the sub-features may be compared (for example, comparing a portion of an e-mail address before an @ symbol to a portion of an e-mail address between an "@" and a ".".

At step 106, similarity coefficients are generated for each pairwise feature set. The similarity coefficients represent the similarity or difference between the strings within each pairwise feature set. The similarity coefficients, referred to herein as "pairwise feature set scores," may be used to categorize a third-party participant into a selected one of a plurality of potential categories. In some embodiments, the pairwise feature set scores are equal to a value determined at step 104, such as, for example, the Levenshtein distance for each pair of features. In other embodiments, the pairwise feature set scores may be related to, but not equal to, a value determined at step 104.

In some embodiments, certain pairwise feature set scores may be indicative of the quality of a third-party participant. Third-party participants that positively interact with the network platform ("good third-party participants") may have certain pairwise feature set scores in a first range and third-party participants that negatively interact with the network platform ("bad third-party participants") may have pairwise feature set scores in a second range. For example, in some instances, "bad" or "negative" third-party participants may have low and/or extremely high pairwise feature set scores for certain pairwise feature sets. In some embodiments, and as discussed in greater detail below, one or more pairwise feature set scores are used to categorize a third-party participant into one of a plurality of predetermined categories.

In some embodiments, the pairwise feature set scores may be ranked 158 in order of correlation (or impact) with respect to the predetermined categories in the set of training data 152. The ranking may be performed using any suitable model-based ranking for pairwise feature sets. For example, the model-based ranking may include, but is not limited to, random forest ranking, recursive partitioning ranking, support vector machines, maximum entropy ranking, random ferns ranking, etc. It will be appreciated that any suitable model-based ranking process may be applied.

In some embodiments, individual pairwise feature set scores are ranked based on the correlation between the pairwise feature set score and classification of the associated third-party participant into a selected one of the plurality of categories. For example, each pairwise feature set score may be ranked (or weighted) higher based on a higher correlation between the score and the classification of a third-party participant. Some pairwise feature set scores may be ignored (e.g., weighted zero) if the impact of those feature sets on the third-party participant classification is below a predetermined threshold, ranking, etc.

At optional step 108, an ensemble (or consolidated) score is generated for each third-party participant based on two or more individual pairwise feature set scores. The ensemble score may be generated, for example, by weighting each of the calculated pairwise feature set scores and summing (or otherwise combining) the pairwise feature set scores into a single consolidated score. Although embodiments are discussed herein including a single ensemble score, it will be appreciated that two or more ensemble scores may be generated based on different combinations of pairwise feature set scores. For example, a "company" ensemble score may be generated based on pairwise feature set scores including company information and an "individual" ensemble score may be generated based on pairwise feature set scores including individual information.

At step 110, the untrained model 154 is configured to classify (or sort) a third-party participant into one of a plurality of predetermined categories (e.g., groupings, clusters, etc.) using one or more pairwise feature set scores and/or one or more ensemble scores. For example, in some embodiments, and as discussed above, an ensemble score may be generated based on two or more pairwise feature set scores. An ensemble score may be calculated for a third-party participant (for example, as discussed above in steps 104-108) and compared to a threshold determined using the set of training data 152. For example, in some embodiments, if the ensemble score is equal to or greater than the predetermined threshold, the third-party participant is classified as an "approved participant" and if the ensemble score is less than the predetermined threshold, the third-party participant is classified as a "rejected participant."

As another example, in some embodiments, one or more individual pairwise feature set scores may be used to classify a third-party participant into one of the predetermined categories. Certain pairwise feature set scores may correlate with desirable participants and other pairwise feature set scores may correlate with undesirable participants. The individual pairwise feature set scores may be selected through an iterative process applied during training of the untrained model 154, as discussed above.

As yet another example, in some embodiments, one or more individual pairwise feature set scores and at least one ensemble score is used to classify a third-party participant. In some embodiments, one or more pairwise feature set scores are used as an initial gatekeeping classification to quickly screen/eliminate potential third-party participants that have a high correlation to undesirable third-party participants. For example, in some embodiments, desirable third-party participants may have a high similarity between a name (such as an individual name) and an e-mail address and undesirable third-party participants have a low correlation between a seller's name and an e-mail address. The pairwise feature set score for a pair including at least a portion of an e-mail address and an individual name may be calculated and compared to a threshold as an initial filtering step. If the e-mail:name feature set score is equal to or greater than a predetermined threshold, an ensemble score is calculated for the third-party participant and the ensemble score is used to further classify the third-party participant into one of a plurality of potential categories. If the e-mail: name feature set score is less than the predetermined threshold, the third-party participant classified as a "rejected participant."

At step 112, a trained model 160 is output and stored on a system for use in a third-party participant evaluation process, as described in greater detail below. The trained model 160 may be provided to a single system, provided to multiple systems, provided to a production environment for implementation on various production systems, and/or otherwise provided for use, for example, with respect to a network platform. In some embodiments, a trained model 160 may be updated and/or retrained based on new and/or updated information. An updated trained model 160 may be generated and provided for use in real-time and/or on a predetermined schedule, such as, for example, daily, weekly, monthly, etc. For example, in some embodiments, new third-party participants may be added to the network platform, initially approved third-party participants may be quarantined and/or removed from the network platform (e.g., due to bad behavior, poor sales, etc.) and some approved participants that were close to rejection may prove to be highly desirable third-party participants (well-reviewed, high responsiveness, etc.). The trained model 160 may be retrained and/or updated using the new information to maintain accurate groupings and assessments for approved, rejected, or otherwise classified third-party participants.

Figure 5:
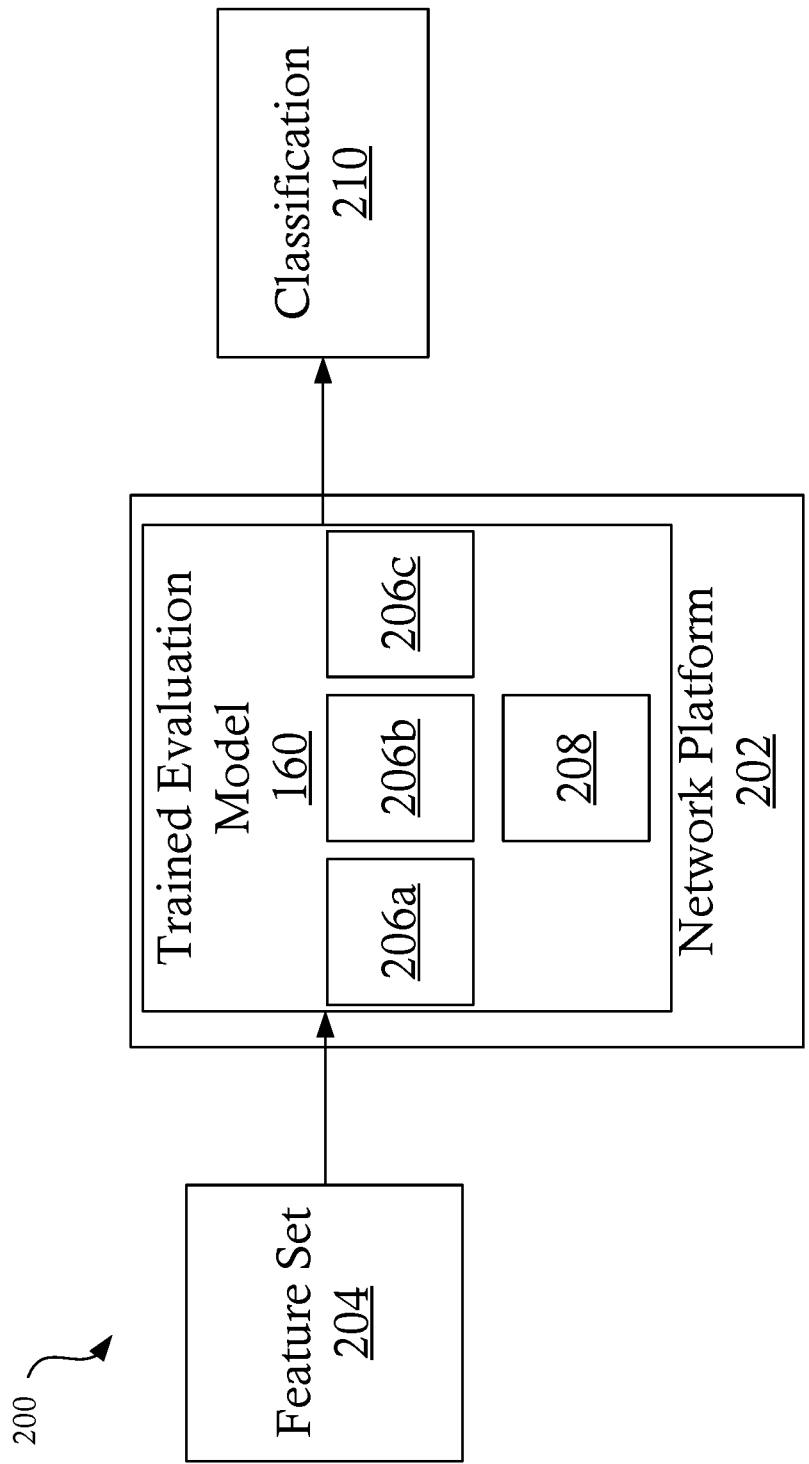
FIG. 5 illustrates a process flow of evaluating a third-party participant, in accordance with some embodiments.

FIG. 5 illustrates a process flow 200 of classifying a third-party participant and providing access to a network platform 202, such as an e-commerce platform, in accordance with some embodiments. One or more features associated with a third-party participant are received by a network platform, such as an e-commerce platform. For example, in some embodiments, a potential third-party participant interacts with a network platform using a third-party system 26a. The potential third-party participant provides a set of features 204 to the network platform 202. For example, in some embodiments, an input form is presented via a third-party system 26a and the third-party participant (or an agent thereof) completes the form to provide the requested features. In some embodiments, one or more features are collected automatically from a third-party system 26a during communication between the third-party system 26a and the network platform 202.

In some embodiments, third-party features may be obtained from a storage device in signal communication with the evaluation system 28 (and/or any other suitable system in the network environment). For example, in some embodiments, features of a current, approved third-party participant may be obtained from a third-party information database 32 to re-evaluate at certain times (e.g., randomly, periodically, etc.) to determine if the third-party participant remains a desirable participant. Re-evaluation of a third-party participant may be based on originally collected features and/or features generated based on interactions between the third-party participant and the network platform. For example, in some embodiments, a tracking system 34 may generate one or more metrics for each third-party participant and generate one or more pairwise feature set scores based on sets including one or more of the metrics.

In various embodiments, the feature set 204 may include features including, but not limited to, one or more features related to a third-party entity (e.g., a company/entity name, company/entity address, company/entity state of incorporation, company/entity website, etc.), features related to an individual third-party or agent of a third-party entity (e.g., name, e-mail address, physical address, demographic information, system information (e.g., internet protocol address (IP)), etc.), performance metrics measured and/or calculated based on interactions between the third-party participant and the network platform (e.g., engagement score, customer satisfaction, sales, returns, complaints, etc.) and/or any other suitable features associated with a third-party participant.

The feature set 204 is provided to an evaluation system 28 including a trained model 160 configured to evaluate and classify a third-party participant. For example, in some embodiments, an evaluation system 28 includes a trained model 160 configured to classify a potential third-party participants into one of a plurality of predetermined categories according to the process 200 discussed above with respect to FIGS. 3 and 4. The trained model 160 may calculate two or more pairwise feature set scores 206a-206c based on pairs of feature selected from the set of features 204. In some embodiments, an ensemble score 208 is calculated from two or more of the pairwise feature set scores 206a-206c, for example, as discussed with respect to FIGS. 3 and 4 above. One or more pairwise feature set scores 206a-206c and/or the ensemble score 208 are used to classify 210 the third-party participant into one of the plurality of predetermined categories. In the example illustrated in FIG. 5, a third-party participant can be classified as an "approved participant," a "rejected participant," or "a provisional participant."

If a third-party participant is classified as an "approved participant," the third-party participant is considered suitable for participation on the network platform in one or more roles traditionally filled by a first-party. The third-party participant may be granted (or maintain) access to the network platform in a first-party role. If the third-party participant is classified as a "rejected participant," the third-party participant is considered not-suitable for participation on the network platform in one or more roles traditionally filled by a first-party. In some embodiments, the network platform may generate one or more notifications identifying why the third-party participant was rejected (although it will be appreciated that such notifications may be omitted to prevent third-party participants from trying to manipulate the evaluation process).

If a potential third-party participant is classified as a "provisional participant," the third-party participant may be given limited and/or provisional access to the network platform. For example, a third-party participant may have one or more pairwise feature set scores and/or ensemble scores that places the third-party participant near the threshold of being rejected. In such instances, the third-party participant may be provided limited access to the network platform, for example, limiting the number and/or types of interactions the third-party participant can have with the network platform for a predetermined time period. After the predetermined time period, the third-party participant may be reevaluated (either using the evaluation process disclosed herein or a separate evaluation process) to determine whether the third-party participant should be given full approval or be removed from the network platform. Although embodiments are discussed herein including three classifications, it will be appreciated that the trained model 160 may be configured to classify third-party participants into two classifications (e.g., approved or rejected) and/or more than three classifications.

Although the subject matter has been described in terms of exemplary embodiments, it is not limited thereto. Rather, the appended claims should be construed broadly, to include other variants and embodiments, which may be made by those skilled in the art.

What is claimed is:

1. A system for generating item recommendations, comprising:
   one or more processors;
   a memory having instructions stored thereon, that when executed by the one or more processors, cause the one or more processors to:
      based at least in part on communications between a computing device of a third-party participant and a networked environment, obtain a plurality of features representative of the third-party participant;
      based on the plurality of features representative of the third-party participant obtained from communications between the computing device of the third-party participant and the networked environment, implement one or more operations to determine a level of access for the third-party participant to the networked environment, the one or more operations including:
         determining at least one pairwise feature score for a pairwise feature set, the pairwise feature score being based on a comparison between a first feature of the plurality of features and a second feature of the plurality of features;
         classifying the third-party participant into one of a plurality of predetermined categories by a trained model based on the at least one pairwise feature score; and
         based on the classification, determining the level of access to the networked environment for the third-party participant, the level of access including a number and type of interactions between the computing device of the third-party participant and the networked environment.

2. The system of claim 1, wherein execution of the instructions by the one or more processors further causes the one or more processors to:
   calculate two or more pairwise comparisons for features included in the plurality of features; and
   calculate an ensemble score based on the two or more pairwise comparisons.

3. The system of claim 2, wherein the trained model classifies the third-party participant by comparing the ensemble score to at least one predetermined threshold.

4. The system of claim 1, wherein the trained model classifies the third-party participant by comparing the at least one pairwise feature score to a predetermined threshold.

5. The system of claim 1, wherein the at least one pairwise feature score is calculated as a Levenshtein distance between the first feature and the second feature.

6. The system of claim 1, wherein the plurality of predetermined categories includes an approved participant category and a rejected participant category.

7. The system of claim 1, wherein the trained model is generated using a model-based ranking of pairwise feature scores.

8. The system of claim 1, wherein the trained model is generated from a set of training data including a plurality of third-party participants each classified into one of the plurality of predetermined categories.

9. A non-transitory computer readable medium having instructions stored thereon, wherein the instructions, when executed by a processor cause a device to perform operations comprising:
   based at least in part on communications between a computing device of a third-party participant and a networked environment, obtaining a plurality of features representative of the third-party participant;
   based on the plurality of features representative of the third-party participant obtained from communications between the computing device of the third-party participant and the networked environment, implementing one or more operations to determine a level of access for the third-party participant to the networked environment, the one or more operations including:
      determining at least one pairwise feature score for a pairwise feature set, the pairwise feature score being based on a comparison between a first feature of the plurality of features and a second feature of the plurality of features;

classifying the third-party participant into one of a plurality of predetermined categories using a trained model based on the at least one pairwise feature score; and based on the classification, determining the level of access to the networked environment for the third-party participant, the level of access including a number and type of interactions between the third-party participant and the networked environment.

10. The non-transitory computer-readable medium of claim 9, wherein the instructions, when executed by the processor cause the device to perform operations comprising:

calculating two or more pairwise comparisons for features included in the plurality of features; and calculating an ensemble score based on the two or more pairwise comparisons.

11. The non-transitory computer-readable medium of claim 10, wherein the trained model classifies the third-party participant by comparing the ensemble score to at least one predetermined threshold.

12. The non-transitory computer-readable medium of claim 9, wherein the trained model classifies the third-party participant by comparing the at least one pairwise feature score to a predetermined threshold.

13. The non-transitory computer-readable medium of claim 9, wherein the at least one pairwise feature score is calculated as a Levenshtein distance between the first feature and the second feature.

14. The non-transitory computer-readable medium of claim 9, wherein the plurality of predetermined categories includes an approved seller category and a rejected seller category.

15. The non-transitory computer-readable medium of claim 9, wherein the trained model is generated using a model-based ranking of pairwise feature scores.

16. A computer-implemented method of evaluating a third-party participant in a networked environment, comprising:

based at least in part on communications between a computing device of a third-party participant and a networked environment, obtain a plurality of features representative of the third-party participant;

based on the plurality of features representative of the third-party participant obtained from communications between the computing device of the third-party participant and the networked environment, implementing one or more operations to determine a level of access for the third-party participant to the networked environment, the one or more operations including:

determining at least one pairwise feature score for a pairwise feature set, the pairwise feature score being based on a comparison between a first feature of the plurality of features and a second feature of the plurality of features;

classifying the third-party participant into one of a plurality of predetermined categories using a trained model based on the at least one pairwise feature score; and based on the classification determining the level of access to the networked environment for the third-party participant, the level of access including a number and type of interactions between the third-party participant and the networked environment.

17. The computer-implemented method of claim 16, comprising:

calculating two or more pairwise comparisons for features included in the plurality of features; and calculating an ensemble score based on the two or more pairwise comparisons.

18. The computer-implemented method of claim 17, wherein the trained model classifies the third-party participant by comparing the ensemble score to at least one predetermined threshold.

19. The computer-implemented method of claim 16, wherein the trained model classifies the third-party participant by comparing the at least one pairwise feature score to a predetermined threshold.

20. The computer-implemented method of claim 16, wherein the at least one pairwise feature score is calculated as a Levenshtein distance between the first feature and the second feature.

* * * * *